(12) United States Patent
Deneault et al.

(10) Patent No.: US 8,720,170 B2
(45) Date of Patent: May 13, 2014

(54) HEADER HEIGHT CONTROL WITH TIRE FLEX COMPENSATION

(75) Inventors: Dustin D. Deneault, LeClaire, IA (US); Douglas J. Bollin, Port Byron, IL (US)

(73) Assignee: Deere & Company, Moline, IL (US)

( * ) Notice: Subject to any disclaimer, the term of this patent is extended or adjusted under 35 U.S.C. 154(b) by 266 days.

(21) Appl. No.: 13/275,702

(22) Filed: Oct. 18, 2011

(65) Prior Publication Data
US 2013/0091819 A1  Apr. 18, 2013

(51) Int. Cl.
*A01D 41/14*  (2006.01)

(52) U.S. Cl.
USPC ........................................ 56/10.2 E; 701/50

(58) Field of Classification Search
USPC .............. 56/10.2 R, 10.2 E, 208–217; 701/50
See application file for complete search history.

(56) References Cited

U.S. PATENT DOCUMENTS

| 5,794,421 | A | 8/1998 | Maichle |
| 6,766,236 | B1 * | 7/2004 | Lamela et al. ................... 701/50 |
| 6,789,379 | B2 | 9/2004 | Heidjann et al. |
| 7,870,709 | B2 * | 1/2011 | Digman ..................... 56/10.2 E |
| 7,908,838 | B2 * | 3/2011 | Hohlfeld et al. ................ 56/228 |
| 8,321,093 | B2 * | 11/2012 | Pollklas et al. ................. 701/50 |
| 2011/0099962 | A1 | 5/2011 | Coers et al. |

FOREIGN PATENT DOCUMENTS

EP  2181579 B1  11/2012

OTHER PUBLICATIONS

European Search Report, dated Feb. 1, 2013 (6 pages).

* cited by examiner

*Primary Examiner* — Alicia Torres

(57) ABSTRACT

A header height control system (208) includes a header height sensor (108) and a tire compression sensor (212) coupled to an electronic control unit (210). The two signals are combined by the electronic control unit (210) to derive a compensated header height signal that compensates for the transient flexure of the pneumatic tires of the vehicle. This compensated header height signal is then used in a header height control algorithm executed by the electronic control unit (210) to control the height of the header (104).

14 Claims, 3 Drawing Sheets

US 8,720,170 B2

HEADER HEIGHT CONTROL WITH TIRE FLEX COMPENSATION

FIELD OF THE INVENTION

This invention relates to agricultural vehicles. More particularly it relates to combine harvesters. Even more particularly it relates to height control for headers of combine harvesters.

BACKGROUND OF THE INVENTION

Combine harvesters are large agricultural machines that travel through agricultural fields cutting, threshing, separating and cleaning crop plants. They comprise a self-propelled agricultural vehicle with threshing, separating, and cleaning mechanisms. They also comprise cutting mechanisms mounted on the front of the vehicle for cutting and gathering a wide swath of crop and feeding that crop into the threshing, separating and cleaning mechanisms of the vehicle. The vehicle or vehicle and cutting mechanism may be called a "harvester", a "combine harvester", an "agricultural combine" or like terms.

The cutting mechanisms are variously called "cutting heads", "harvesting heads", "heads", "headers" or like terms. The headers typically comprise elongated frames that support elongated knives and crop conveyors. The headers can be twenty to forty feet wide. They are typically suspended on, and cantilevered forward from, an elevating crop conveyor or "feederhouse". The feederhouse is pivotally connected to and extends forward from the chassis or frame of the vehicle.

Headers that are designed to harvest low-lying crop plants like soybeans or wheat must follow the ground very closely so the knives on the header that sever the plant from the ground can reach completely under the plant, sever the plant stalk and substantially the entire plant can be harvested.

The ground in the agricultural fields is not perfectly flat, hence header height control systems are used to automatically raise and lower the header with respect to the vehicle as the combine harvester travels through the field. As the ground rises and falls underneath the header, the header height closed loop control system raises and lowers the feederhouse in response to maintain a constant distance between the header (mounted on the front of the feederhouse) and the ground.

It is difficult to maintain a constant distance between the header and the ground. In recent years, engineers have designed wider and heavier headers. In addition, they have designed vehicles with larger wheels and tires to distribute this increased load more evenly on the ground and therefore reduce ground compaction.

The larger tires act like springs, permitting the vehicle, and hence the header mounted on the front of the vehicle to bounce up and down as the wheels roll over the ground. Even worse, the system is under-actuated as the vehicle wheels can be so soft that they compress in reaction to the header height control system lifting the header and decompress in reaction to the header height control system lowering the header.

In extreme cases, the header height control system and compressible tires can be so bad that the tires of the combine harvester begins to hop completely off the ground as the header height control system becomes unstable.

What is needed is a header height control system that dynamically dampens the response to compensate for the flexibility (i.e. compression and decompression) of the combine harvester tires. It is an object to provide this system. The problem is solved by the arrangement of claim 1, additional features and benefits are provided by the arrangements of the claims dependent on claim 1.

SUMMARY OF THE INVENTION

In accordance with one aspect of the invention, a header height control system includes a header height sensor and a tire compression sensor coupled to an electronic control unit. The electronic control unit is programmed to control the height of the header to a predetermined distance above the ground. The electronic control unit receives a signal from the header height sensor indicating the position of the header with respect to the ground, receives a signal from the tire compression sensor indicating the degree of compression of the tires, combines the two signals, and uses the combined signal as the feedback signal in a position control algorithm, and applies the output signal from the position control algorithm to the feederhouse lift cylinder control valve.

To combine the two signals the electronic control unit adds the signal from the tire compression sensor to the header height sensor.

Other devices that could be used for a body motion/tire compression sensor may be a tire pressure sensor, or a feederhouse lift cylinder pressure signal, an accelerometer, a rate gyroscope, mechanical sensor on front and rear axles, and a suspension deflection sensor.

In accordance with another aspect of the invention, an agricultural harvester, comprises a self-propelled vehicle having a front; a feederhouse pivotally mounted on the front of the self-propelled vehicle; pneumatic tires supporting the vehicle for movement over the ground; a header mounted on the front of the self-propelled vehicle; hydraulic cylinders coupled to and between the self-propelled vehicle and the feederhouse to raise and lower the feederhouse when the hydraulic cylinders are extended and retracted; a valve coupled to the hydraulic cylinders to control hydraulic fluid flow to the hydraulic cylinders from a source of hydraulic fluid under pressure, and to conduct hydraulic fluid from the hydraulic cylinders to a reservoir; a header height control circuit further comprising an electronic control unit coupled to the valve wherein the electronic control circuit is configured to drive the valve to raise and lower the header, a tire compression sensor coupled to the electronic control circuit wherein the tire compression sensor is configured to provide the electronic control unit with a signal indicative of compression of the pneumatic tires, and a header height sensor disposed to generate a signal indicative of the height of the header with respect to the ground.

The electronic control unit may be configured to receive the signal indicative of compression of the pneumatic tires, and to receive the signal indicative of the height of the header with respect to the ground, and combine the two signals to create a compensated header height signal. The electronic control unit may be configured to determine a header height error signal based upon a combination of the compensated header height signal and a reference signal indicative of a commanded header height. The electronic control unit may be configured to calculate a control signal based upon the header height error signal that will move the header to the commanded height. The control signal may be proportional to the header height error signal. The electronic control unit may be configured to calculate a valve signal that is applied to the valve. The electronic control unit may signal the valve to drive the hydraulic cylinders at a velocity of extension or contraction that is proportional to the header height error signal. The tire compression sensor may be configured to sense a fluid pressure of at least one of the hydraulic cylinders.

In accordance with another aspect of the invention, there is provided a header height control circuit for controlling the height of a header mounted on a self-propelled vehicle having pneumatic tires to carry the self-propelled vehicle over the ground, the header height control circuit comprising an electronic control unit drivingly coupled to actuators that raise and lower the header; a tire compression sensor coupled to an electronic control unit to provide a signal indicative of compression of the pneumatic tires to the electronic control unit; and a header height sensor coupled to the electronic control unit to provide a signal indicative of the height of the header.

The electronic control unit may be configured to receive the signal indicative of compression of the pneumatic tires, and to receive the signal indicative of the height of the header, and combine the two signals to create a compensated header height signal. The electronic control unit may be configured to determine a header height error signal based upon a combination of the compensated header height signal and a reference signal indicative of a commanded header height. The electronic control unit may be configured to calculate a control signal based upon the header height error signal that will move the header to the commanded height. The control signal may be proportional to the header height error signal. The electronic control unit may be configured to calculate a valve signal that is applied to the valve. The electronic control unit may signal the valve to drive the hydraulic cylinders at a velocity of extension or contraction that is proportional to the header height error signal. The electronic control unit may be programmed to control the header to a predetermined height above the ground.

DESCRIPTION OF THE PREFERRED EMBODIMENT

Figure 1:
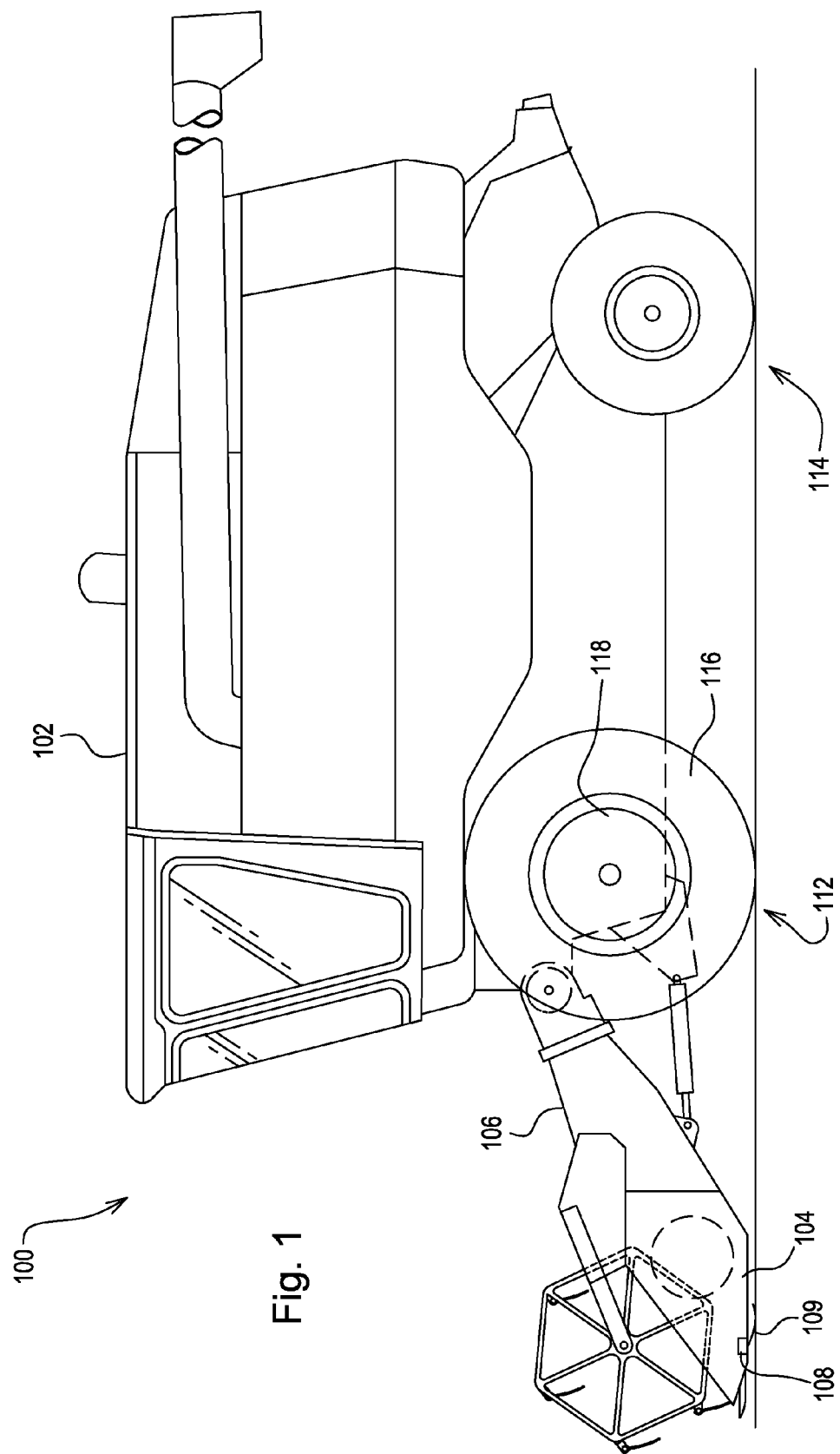
FIG. 1 illustrates an agricultural combine with a header in accordance with the present invention.

Referring to FIG. 1, an agricultural harvester 100 is shown comprising a self-propelled vehicle 102 and a header 104. The header is supported on a feederhouse 106 which extends forward from the front end of the vehicle 102. The feederhouse is pivotally coupled to the vehicle 102 such that its front end can pivot up and down with respect to the chassis or frame of vehicle 102 and thereby raise or lower the header 104 which is supported on the front of the feederhouse 106.

A header height sensor 108 is coupled to the header 104 to sense the distance between the header and the ground.

The vehicle 102 is supported on four wheels, comprising two front wheels 112 and two rear wheels 114 (only one shown). Front wheels 112 may comprise a single wheel on each side of the vehicle, or they may comprise two wheels on each side of the vehicle. The front wheels 112 include pneumatic tires 116 that are mounted on rims 118 and are filled with pressurized air or other compressible material. The front wheels 112 do not steer, but are fixed to point straight ahead in the direction of travel. The rear wheels are steerable by the operator to turn the agricultural combine in the field.

The front wheels are large and have relatively flexible sidewalls. They are made to conform to the field on their bottom surfaces and place a relatively broad and wide footprint upon the ground. This large footprint is only possible with a reduced air pressure in the tire that leaves the tread relatively flexible to follow the contours of the ground. As a result, when the load on the vehicle 102 increases and decreases, the contact patch of the tire on the ground changes shape, increasing its size and flattening on the bottom with additional load, and decreasing in size and becoming more round when the load on the combine decreases.

When the rear wheels are compressed due to increased load on the vehicle 102, the center of the wheels moves closer the ground, the sidewalls bulge, the profile of the wheel flattens and the contact patch increases in size.

One transient cause of this increased load can be accelerations caused by ground kinematics (e.g. the rising and falling of the surface of the ground on which the wheels roll) pushing the bottom of the tires and pushing the chassis of the vehicle upward or dropping out from under the wheels. Another transient cause of this increased load can be due to the feederhouse being lifted or lowered with respect to the vehicle 102 by the header height control system.

Regardless of the cause of the increased load, one thing is true: in a matter of several hundred milliseconds, the vehicle will spring upward, releasing the energy stored in the tires in the form of flexed sidewalls and increased air pressure in the tires and the vehicle and header will return to their previous height.

The header height control system compresses the tires in a vertical direction whenever it suddenly lifts the header with respect to the vehicle. Once it has finished lifting the header the wheels will release their tension, decompress, and the vehicle (and header) will be pushed upward, back to the nominal shape they have when standing still.

Figure 2:
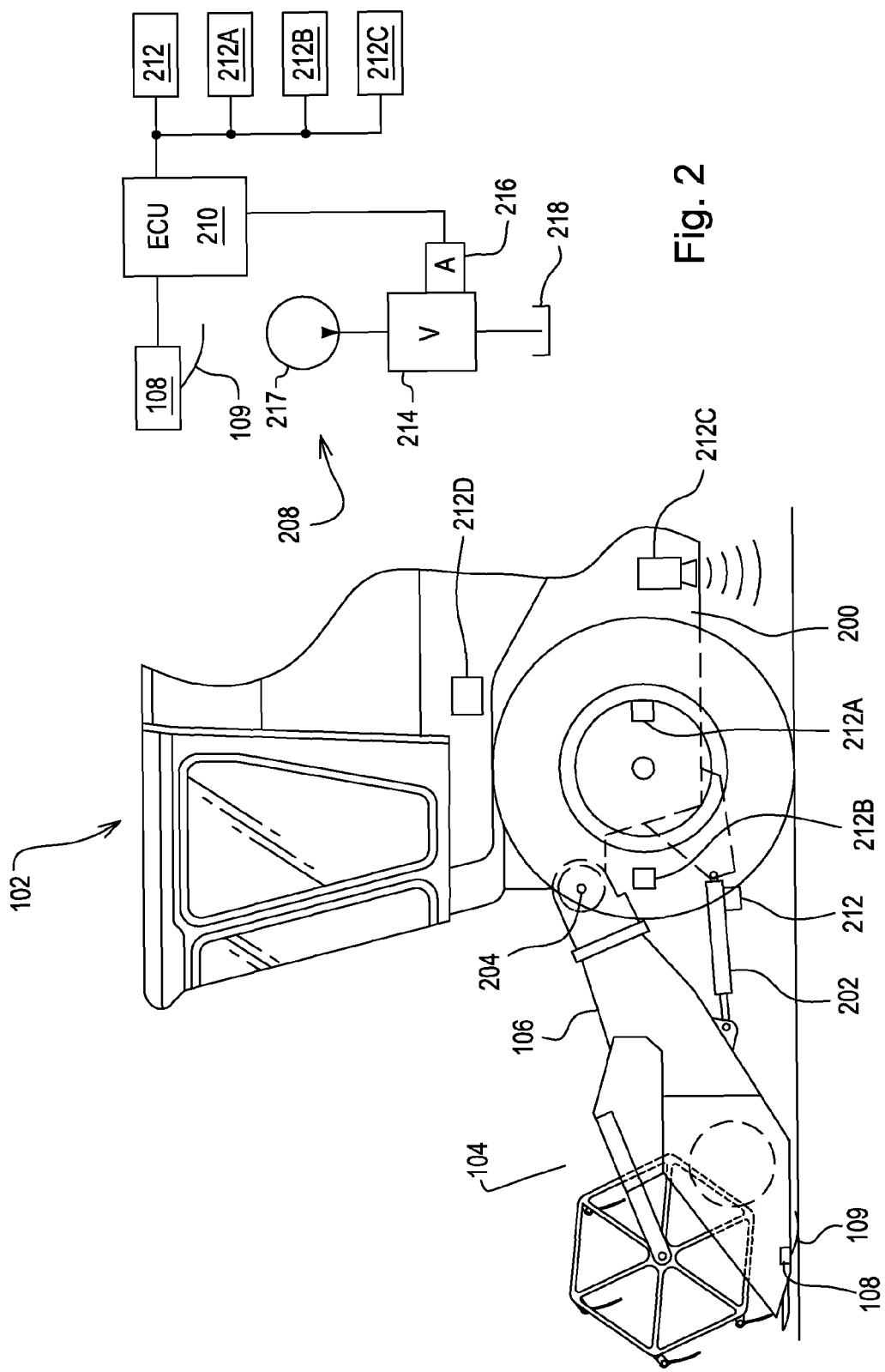
FIG. 2 is a schematic diagram of the components of the header height control system.

Referring to FIG. 2, the header 104 is supported on the front of the feederhouse 106. The rear of the feederhouse is pivotally coupled to the chassis 200 of the vehicle 102. Actuators (here shown as feederhouse hydraulic lift cylinders 202) are fixed in parallel on opposite sides of the feederhouse, and are coupled to the chassis 200 at one end and to the feederhouse 106 at the other end. While two actuators are shown herein, either one is sufficient.

When the cylinders 202 are extended, they cause the feederhouse to pivot with respect to the vehicle 102 about pivot joint 204 and cause the front of the feederhouse (and hence the header 104) to rise higher above the ground. When the cylinders 202 are retracted, they cause the feederhouse 106 to pivot in the opposite direction with respect to the vehicle 102 and cause the feederhouse (and hence the header 104) to fall closer to the ground.

A header height control circuit 208 is provided to control the height of the header 104 above the ground by extending and retracting cylinders 202. Header height control circuit 208 comprises an electronic control unit 210 which further comprises a digital microcontroller, valve driver circuits, signal processing circuits, digital memory for storing digital instructions for the digital microcontroller, and a working memory for storing numeric values used by the digital microcontroller when it executes the instructions stored in the digital memory.

Header height control circuit 208 also comprises a tire compression (more generally, body motion) sensor 212 which generates a signal indicative of the degree of compression of the front tires of the vehicle 102 (more generally a signal indicative of the motion of the body in a vertical direction). In this embodiment the tire compression sensor 212 correlates to the hydraulic fluid pressure in the cylinders 202, the changing pressure in the cylinders indicating the degree of compression of the front tires. Alternatively, the tire compression sensor could be a sensor 212A that indicates the air pressure inside one or both front wheels 112 since fluctuations in air pressure in a tire indicate the degree of tire compression. Alternatively it could comprise a strain gauge 212B to measure the flexure in the walls of the front tires since the flexure of the side walls indicates the degree of compression of the tires. Alternatively it could be a non-contact sensor 212C such as a radar or laser sensor that is located adjacent to the front tires such that it detects the distance to the ground underneath the front tires and thus the degree of compression of the front tires.

Header height control circuit 208 also comprises the header height sensor 108. Header height sensor 108 preferably comprises a potentiometer coupled to elongate member 109 to provide a signal indicative of the position (height) of the header 104 with respect to the ground. The header height sensor 108 preferably is a contact sensor as shown here. The contact sensor preferably includes the elongate member 109 that extends from a sensing element of the sensor and drags on the ground as the vehicle is propelled forward through the agricultural field. Alternatively, it may be a range finding device, preferably a signal-reflecting device such as a radar or laser device.

Both the header height sensor 108 and the tire compression/body motion sensor 212 are coupled to electronic control unit 210 to provide the electronic control unit 210 with signals that indicate the header height and the tire compression of the front tires, respectively.

Header height control circuit 208 also comprises valve 214. Valve 214 includes a solenoid actuator 216 that is coupled to and controlled by electronic control unit 210. Valve 214 is also coupled to a source of pressurized hydraulic fluid 217 and to a hydraulic fluid reservoir 218. Hydraulic fluid reservoir 218 provides hydraulic fluid at a substantially constant pressure over a wide range of flow rates. Electronic control unit 210 is configured to selectively signal valve 214 to supply hydraulic fluid under pressure to feederhouse lift cylinders 202 from source 217 thereby extending the cylinders 202 and raising the feederhouse and header. Electronic control unit 210 is also configured to selectively signal valve 214 to release hydraulic fluid under pressure from cylinders 202 to reservoir 218 thereby retracting the cylinders 202 and lowering the feederhouse and header. Valve 214 is a proportional control valve in which the opening of the valve (and hence the flow through the valve) is proportionate to the signal applied to the valve. In the preferred embodiment the signal applied to the valve 214 is a current signal.

The valve driver circuit in electronic control unit 210 transmits a variable, pulse-width modulated signal to the solenoid actuator 216 that is proportional to the desired volumetric flow rate of hydraulic fluid through the valve to the hydraulic cylinders 202. This flow rate, in turn, is proportional to the velocity of extension or retraction of the hydraulic cylinders 202. Each valve command applied to the solenoid actuator is proportional to a desired or target velocity (of extension or retraction) of the cylinders 202. The particular velocity of extension and retraction depends primarily upon the geometry of the cylinder, the geometry of its attachment points to the feederhouse and the combine, and the weight of the header and feederhouse. The particular velocity function generated by the algorithm can be determined empirically by choosing different velocity functions inserting a step function into the system and determining if the damped response is stable, and if stable is over- or under-damped as desired to give the fastest response with the lowest desirable tendency to become unstable.

Valve 214 may comprise multiple valve elements, in which one element (or more) is actuated to fill the cylinders with fluid and raise the feederhouse, and another one (or more) is actuated to empty the cylinders of fluid and lower the feederhouse. Solenoid actuator 216 may comprise multiple solenoid coils, each of which may be independently energized by the electronic control unit 210 to operate the valve 214. Further, at least one (or more) coil may be provided to operate valve elements to raise the feederhouse and at least one (or more) coils may be provide to operate valve elements to empty the cylinders of fluid and lower the feederhouse. Preferably a first solenoid coil is provided that raises the feederhouse when actuated by the electronic control unit 210 and a second solenoid coil is provided to lower the feederhouse when actuated by the electronic control unit 210.

Figure 3:
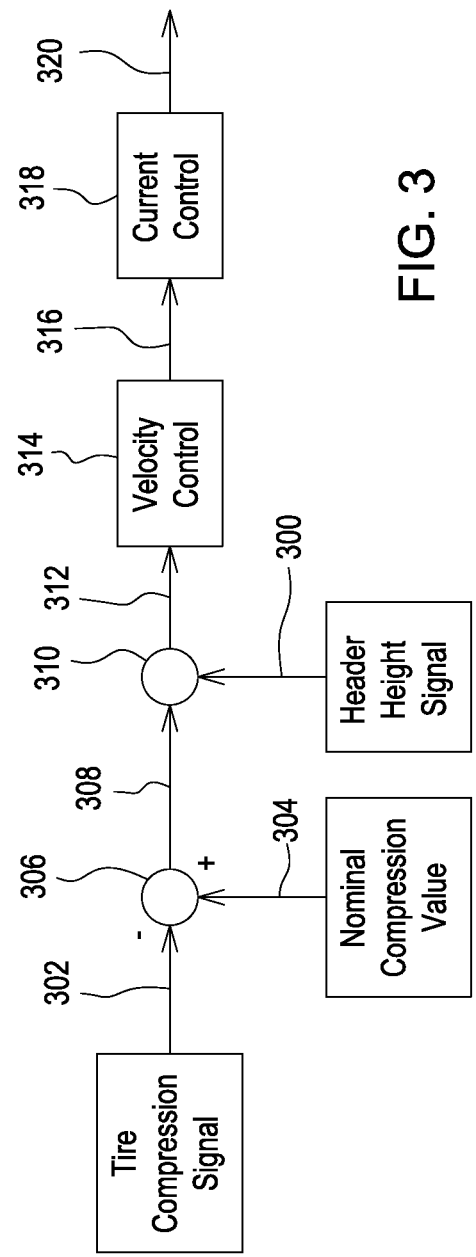
FIG. 3 is a control algorithm diagram.

FIG. 3 illustrates the control algorithm stored in the memory circuits of the electronic control unit 210 that is executed by the electronic control unit 210 during operation of the agricultural combine.

The system receives a header height signal 300 from the header height sensor 108. This signal indicates the position (height) of the header with respect to the ground. It also receives a tire compression signal 302 from the tire compression sensor 212 that indicates the instantaneous compression of the tire and receives a nominal tire compression signal 304 indicative of a pressure in the tires when operating on a level surface. These signals indicate the degree of compression of the front tires.

The system combines the two signals at node 306.

The compression signal 302 is provided to a pressure dampening/cancellation algorithm, at the node 306, which subtracts the compression signal from a nominal compression value to derive a signal 308 indicative of a change (or delta) in compression from nominal compression to the actual, measured tire compression.

This delta compression signal 308 is indicative of transient tire compression, i.e. that portion of the tire compression that is different than nominal (e.g. average) compression of the tires as they roll across flat ground without the tires and vehicle dynamics (i.e. without the tires bouncing up and down, compressing and decompressing). The delta compression signal 308, in effect, measures the upward or downward flexure of the wheels with respect to this nominal compression.

At summing node 310 the algorithm sums the header height signal 300 and the delta compression signal 308 to produce a compensated header height signal 312. This signal indicates more closely what the height of the header will be when the front tires bounce back (i.e. return) to their nominal position.

Once the compensated header height signal has been calculated it is then provided to the basic header height control algorithm, which in this case is a velocity control algorithm 314. Velocity control algorithm 314 receives the compensated header height signal 312, compares the compensated header height with the target header height (i.e. the height at which the operator prefers to operate the header) and generates a velocity signal 316 indicative of the desired header 104 velocity to get the header to the target header height.

Velocity signal 316 is then provided to the current control algorithm 318, which generates a current command 320 indicative of the current that must be generated by a valve driver circuit in the electronic control unit 210 and applied to the solenoid actuator 216 to cause valve 214 to open an amount sufficient to move the hydraulic cylinders 202 at the commanded velocity.

Having described the preferred embodiment, it will become apparent that various modifications can be made without departing from the scope of the invention as defined in the accompanying claims.

The invention claimed is:

1. An agricultural harvester (100), comprising:
   a self-propelled vehicle (102) having a front; a feederhouse (106) pivotally mounted on the front of the self-propelled vehicle (102);
   pneumatic tires (116) supporting the vehicle (102) for movement over the ground;
   a header (104) mounted on the front of the self-propelled vehicle (102);
   hydraulic cylinders (202) coupled to and between the self-propelled vehicle (102) and the feederhouse (106) to raise and lower the feederhouse (106) when the hydraulic cylinders (202) are extended and retracted;
   a valve (214) coupled to the hydraulic cylinders (202) to control hydraulic fluid flow to the hydraulic cylinders (202) from a source of hydraulic fluid under pressure, and to conduct hydraulic fluid from the hydraulic cylinders (202) to a reservoir;
   a header height control circuit (208) further comprising an electronic control unit (210) coupled to the valve (214) wherein the electronic control circuit is configured to drive the valve (214) to raise and lower the header (104), a tire compression sensor (212) coupled to the electronic control circuit (210) wherein the tire compression sensor is configured to provide the electronic control unit (210) with a signal indicative of compression of the pneumatic tires (116), and a header height sensor (108) disposed to generate a signal indicative of the height of the header (104) with respect to the ground and wherein the electronic control unit (210) is configured to receive the signal indicative of compression of the pneumatic tires (116), and to receive the signal indicative of the height of the header (104) with respect to the ground, and to combine the two signals to create a compensated header height signal.

2. The agricultural harvester (100) of claim 1, wherein the electronic control unit (210) is configured to determine a header height error signal based upon a combination of the compensated header height signal and a reference signal indicative of a commanded header height.

3. The agricultural harvester (100) of claim 2, wherein the electronic control unit (210) is configured to calculate a control signal based upon the header height error signal that will move the header to the commanded height.

4. The agricultural harvester (100) of claim 3, wherein the control signal is proportional to the header height error signal.

5. The agricultural harvester (100) of claim 3, wherein the electronic control unit (210) is configured to calculate a valve signal that is applied to the valve (214).

6. The agricultural harvester of claim 3, wherein the electronic control unit signals the valve (214) to drive the hydraulic cylinders (202) at a velocity of extension or contraction that is proportional to the header height error signal.

7. The agricultural harvester of claim 1, wherein the tire compression sensor is configured to sense a fluid pressure of at least one of the hydraulic cylinders (202).

8. A header height control circuit (208) for controlling the height of a header (104) mounted on a self-propelled vehicle (102) having pneumatic tires (116) to carry the self-propelled vehicle (102) over the ground, the header height control circuit (208) comprising:
   an electronic control unit (210) drivingly coupled to actuators (202) that raise and lower the header (104);
   a tire compression sensor (212) coupled to electronic control unit (210) to provide a signal (302) indicative of compression of the pneumatic tires (116) to the electronic control unit (210); and
   a header height sensor (108) coupled to the electronic control unit (210) to provide a signal indicative of the height of the header (104), and
   wherein the electronic control unit (210) is configured to receive the signal indicative of compression of the pneumatic tires (116), and to receive the signal indicative of the height of the header (104), and to combine the two signals to create a compensated header height signal.

9. The header height control circuit (208) of claim 8, wherein the electronic control unit (210) is configured to determine a header height error signal based upon a combination of the compensated header height signal and a reference signal indicative of a commanded header height.

10. The header height control circuit (208) of claim 9, wherein the electronic control unit (210) is configured to calculate a control signal based upon the header height error signal that will move the header to the commanded height.

11. The header height control circuit (208) of claim 10, wherein the control signal is proportional to the header height error signal.

12. The header height control circuit (208) of claim 10, wherein the electronic control unit (210) is configured to calculate a valve signal that is applied to the valve (214).

13. The header height control circuit (208) of claim 10, wherein the electronic control unit signals the valve (214) to drive the hydraulic cylinders (202) at a velocity of extension or contraction that is proportional to the header height error signal.

14. The header height control circuit (208) of claim 8, wherein the electronic control unit (210) is programmed to control the header to a predetermined height above the ground.

* * * * *